(12) United States Patent
Vilasagar et al.

(10) Patent No.: US 9,260,603 B2
(45) Date of Patent: Feb. 16, 2016

(54) POLYMER COMPOSITIONS, METHOD OF MANUFACTURE, AND ARTICLES FORMED THEREFROM

(71) Applicant: SABIC Innovative Plastics IP B.V., Bergen op Zoom (NL)

(72) Inventors: Shripathy Vilasagar, Pakersburg, WV (US); Dejin Li, Athens, OH (US); Amit Kulkarni, Evansville, IN (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 98 days.

(21) Appl. No.: 13/833,736

(22) Filed: Mar. 15, 2013

(65) Prior Publication Data

US 2014/0275424 A1 Sep. 18, 2014

(51) Int. Cl.
    *C08L 69/00* (2006.01)
    *C08L 51/04* (2006.01)
    *C08L 55/02* (2006.01)
    *C08F 279/04* (2006.01)

(52) U.S. Cl.
    CPC .............. *C08L 69/00* (2013.01); *C08F 279/04* (2013.01); *C08L 55/02* (2013.01)

(58) Field of Classification Search
    None
    See application file for complete search history.

(56) References Cited

U.S. PATENT DOCUMENTS

| | | | | |
|---|---|---|---|---|
| 3,944,631 A * | 3/1976 | Yu et al. | ........................ | 525/305 |
| 4,148,842 A * | 4/1979 | Yu et al. | ........................ | 525/148 |
| 4,352,910 A * | 10/1982 | Katto et al. | ................... | 525/183 |
| 4,897,462 A * | 1/1990 | Yusa et al. | ..................... | 528/486 |
| 5,071,946 A | 12/1991 | Schmidt et al. | | |
| 7,393,896 B2 | 7/2008 | DeRudder et al. | | |
| 2004/0102564 A1 | 5/2004 | Guntherberg et al. | | |
| 2006/0247356 A1* | 11/2006 | Agarwal | ....................... | 524/451 |
| 2008/0097009 A1 | 4/2008 | Isaji et al. | | |
| 2009/0036593 A1* | 2/2009 | DeRudder et al. | ............ | 524/506 |
| 2009/0239991 A1 | 9/2009 | Avtomonov et al. | | |
| 2009/0281216 A1* | 11/2009 | Avtomonov et al. | ......... | 524/101 |
| 2010/0069543 A1 | 3/2010 | Monden et al. | | |
| 2010/0282690 A1 | 11/2010 | Padmanabhan et al. | | |
| 2013/0158183 A1* | 6/2013 | Michels | .................. | C08L 55/02 524/504 |
| 2013/0217817 A1* | 8/2013 | Mochizuki et al. | ........... | 524/262 |
| 2013/0253114 A1 | 9/2013 | Seidel et al. | | |
| 2013/0281568 A1* | 10/2013 | Park et al. | ..................... | 523/122 |
| 2014/0147660 A1 | 5/2014 | Miyahiro et al. | | |

FOREIGN PATENT DOCUMENTS

| | | | |
|---|---|---|---|
| EP | 0354330 | A2 | 6/1989 |
| EP | 0668318 | A1 | 2/1995 |
| EP | 0900827 | A2 | 9/1998 |
| EP | 1647558 | A1 | 10/2005 |
| EP | 2465881 | A1 | 12/2011 |
| EP | 2465882 | A1 | 12/2011 |

OTHER PUBLICATIONS

PCT, International Searching Authority, PCT/US2014/027082, Date of mailing: Jun. 30, 2014, 5 pages.
PCT, International Searching Authority, Written Opinion, PCT/US2014/027082, Date of mailing: Jun. 30, 2014, 6 pages.
Patent Cooperation Treaty, International Searching Authority, Search Report, PCT/US2014/027090, Date of mailing: Jul. 8, 2014, 5 pages.
Patent Cooperation Treaty, International Searching Authority, Written Opinion, PCT/US2014/027090, Date of mailing: Jul. 8, 2014, 5 pages.

* cited by examiner

*Primary Examiner* — Jeffrey Mullis
(74) *Attorney, Agent, or Firm* — Cantor Colburn LLP

(57) ABSTRACT

A impact resistant polycarbonate composition comprises an elastomer-modified graft copolymer prepared by an emulsion process in which a composition comprising the elastomer-modified graft copolymer is subjected to treatment with acid to adjust the pH to about 3.0 to about 6.8, following by coagulation of the elastomer-modified graft copolymer and admixture with an aromatic polycarbonate.

21 Claims, No Drawings

POLYMER COMPOSITIONS, METHOD OF MANUFACTURE, AND ARTICLES FORMED THEREFROM

FIELD OF THE INVENTION

The present invention is directed to a polycarbonate thermoplastic composition having improved resistance to polymer degradation. More specifically the composition comprises a combination of an aromatic polycarbonate resin and an elastomer-modified graft copolymer.

BACKGROUND OF THE INVENTION

Polycarbonate/acrylonitrile-butadiene-styrene (PC/ABS) blends, products commercially available from SABIC Innovative Plastics, are an important class of polymeric materials for reasons of their excellent balance of properties such as low-temperature ductility, heat resistance, and outstanding aesthetics combined with ease of processing.

The polycarbonate portion of such a blend, however, is susceptible to degradation by acids and bases, especially under conditions of high heat and humidity. A sufficient amount of degradation can cause undesirable color formation, loss of molecular weight, reduced chemical resistance or inferior mechanical properties, and generation of volatiles which can cause defects in surface appearance, for example, splay in molded parts.

These problems can be exacerbated by the addition of elastomeric impact modifiers that are commonly used to improve the toughness of aromatic carbonate polymer compositions. In particular, an elastomer-containing impact modifier prepared by emulsion polymerization can decrease the stability of a polycarbonate. Specifically, compounds employed as aids in the emulsion polymerization of the impact modifier, during its preparation, can remain as residues within the impact modifier and can, thereby, promote transesterification or degradation of polycarbonate. For example, U.S. Pat. No. 7,393,896 discloses that alkali metal salts of fatty acid emulsifiers, used during emulsion polymerization of an impact modifier, to stabilize the emulsion, can later catalyze transesterification or degradation of a polycarbonate composition containing that impact modifier. In turn, the residual amount of an emulsifier remaining in the impact modifier can cause adverse effects, including inconsistent thermal stability of the polycarbonate composition. This can lead to problems during molding of the composition, due to variability in viscosity resulting from the catalytic transesterification or degradation of polycarbonate.

In view of the above, the use of emulsion-prepared elastomer-modified graft copolymers in polycarbonate compositions has been avoided in some cases in favor of bulk polymerized elastomer-modified graft copolymer in some cases, particularly when a stringent requirement for hydrostability exists such as exists for molded parts in the automotive industry. Bulk polymerized acrylonitrile-butadiene-styrene (bulk ABS) is essentially free of any surfactant. Accordingly, when higher stability is required, bulk ABS has been used in admixture with a small amount of sulfonate-based MBS to improve the impact resistance of polycarbonate compositions, as disclosed in EP 0900827 and U.S. Pat. No. 7,393,896 assigned to Sabic Innovative Plastics.

Because of the relatively lower elastomer content in bulk ABS, however, it usually cannot be used (or used alone) where higher impact resistance is desired such as could otherwise be obtained by an emulsion-prepared ABS. An emulsion-prepared ABS can have elastomer levels as high as 60 wt. % or more.

As indicated above, replacing an alkali metal carboxylate based surfactant, previously used in preparing elastomer-modified graft copolymers, with a sulfonate surfactant can improve the stability of a polycarbonate/ABS blend, as disclosed by U.S. Pat. No. 7,393,896. However, further improvement is still desired to meet the stringent demands for stability required for certain molded parts.

In view of the above, an object of the present invention is to provide an impact modified polycarbonate composition having improved resistance to polymer degradation under strenuous conditions. In particular an improved balance of high impact resistance, hydrostability, and thermal stability is desired.

SUMMARY OF THE INVENTION

After exploring different process and material variables, Applicants surprisingly discovered that adjusting the pH of an elastomer-modified graft copolymer, in a latex composition during its preparation, can significantly improve the hydrostability of a polycarbonate blend that is modified with the elastomer-modified graft copolymer. In particular, the pH is adjusted following emulsion polymerization of the elastomer phase and grafting of one or more monomers to obtain a latex of the elastomer-modified graft copolymer, but before its coagulation and subsequent admixture with a polycarbonate.

In one embodiment, the composition comprising the latex of the elastomer-modified graft copolymer product is alkaline before pH adjustment, and the pH is then decreased by an amount of from 0.5 units to 5 units.

In particular, in one aspect of the invention, the invention is directed to a polycarbonate composition having improved resistance to polymer degradation comprising, in admixture, an aromatic polycarbonate and an elastomer-modified graft copolymer made by grafting monomers onto an elastomer, wherein the elastomer-modified graft copolymer is prepared by a process comprising emulsion polymerization of the elastomer and grafting of the monomers to obtain a latex comprising the elastomer-modified graft copolymer followed by coagulation of the latex to obtain a coagulated elastomer-modified graft copolymer, wherein prior to coagulation, the pH of the latex is decreased by at least about 0.5 pH units to obtain a pH of about 3.0 to about 6.8.

In another aspect of the invention, the acid used to adjust the pH has a $pK_a$ of less than 5.0 and can comprise either a strong mineral acid that completely ionizes in water or an organic acid that does not completely ionize in water. A resulting advantage of such pH adjustment is that, when the elastomer-modified graft copolymer product is later admixed with an aromatic polycarbonate, less degradation of the aromatic polycarbonate can occur.

The invention is also directed to an impact resistant polycarbonate composition having improved resistance to polymer degradation comprising in admixture (a) about 48 to about 75 weight percent of an aromatic polycarbonate and (b) about 52 to about 25 weight percent of an elastomer-modified graft copolymer and optional polymeric flow promoter, based on the total weight of aromatic polycarbonate elastomer-modified graft copolymer, and polymeric flow promoter, wherein the elastomer-modified graft copolymer, before admixture with the aromatic polycarbonate, is prepared by a process comprising emulsion polymerization of at least a diene monomer in the presence of a surfactant selected from the group consisting of substituted or unsubstituted alkyl sulfonates, alkylaryl sulfonate, alkyl sulfates, alkylaryl sulfates, alkyl phosphate, alkylaryl phosphates, and mixtures thereof, thereby forming an diene polymer; grafting one or more monomers onto the diene polymer, thereby forming a latex composition comprising an elastomer-modified graft copolymer, which latex composition is alkaline; and coagulating the latex composition, wherein, prior to coagulation of the latex composition, adjusting its pH by introducing an acid, not a buffer, to obtain a pH of about 3.0 to about 6.8, wherein the acid has a $pK_a$ of less than 5.0.

Another aspect of the invention is directed to a method of preparing an impact modified polycarbonate composition having improved resistance to polymer degradation comprising carrying out emulsion polymerization of a monomer mixture comprising a diene monomer to form a diene polymer; grafting monomers onto the diene polymer to form latex composition comprising an elastomer-modified graft copolymer, which latex composition has an alkaline pH; coagulating the latex composition comprising the elastomer-modified graft copolymer; and admixing the coagulating elastomer-modified graft copolymer with an aromatic polycarbonate; wherein prior to said coagulation and admixture, adjusting the pH of the latex composition comprising the elastomer-modified graft copolymer by introducing acid, not a buffer, to obtain a pH of about 3.0 to about 6.8.

An advantage of the present composition and method is that an impact resistant polycarbonate molding composition can be obtained that, after aging molded ISO tensile bars of the composition in an oven for 1000 hours 90±2° C. and 95±3% RH (relative humidity), has a melt flow rate (MFR) that does not change by more than 5.0 g/10 min units, measured in accordance with ISO 1133 standard at 230° C. using a 3.8 kg load and 300 sec dwell time.

DETAILED DESCRIPTION OF THE INVENTION

Surprisingly, it has now been discovered that degradation of an impact resistant polycarbonate composition can be reduced or eliminated by employing a specified pH adjustment when preparing the impact modifier. In particular, the impact modifier is an elastomer-modified graft copolymer that is prepared by an emulsion polymerization process. Even though inherently carrying residual amounts of polymerization additives into the polycarbonate composition, the impact modifier does not result in significant degradation of the polycarbonate component of the composition.

Thus, this invention is directed to an impact modified polycarbonate polymer composition having improved stabilization to degradation or transesterification, resulting in improved thermal stability or hydrostability during its processing or use. In other words, the present invention is directed to improving of the stability of a polycarbonate composition by going backward in the process of making the impact modifier to be utilized in the polycarbonate composition.

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function. "Or" means "and/or." Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

As used herein, the term "hydrocarbyl" or "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy groups; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

As used herein, pH is the decimal logarithm of the reciprocal of the hydrogen ion activity, as commonly defined and measured.

As indicated above, the invention is directed to a polycarbonate composition comprising an impact modifier, specifically a polycarbonate composition comprising an elastomer-modified graft copolymer, which composition exhibits improved thermal and hydrolytic stability. In particular, the polycarbonate component of the composition has improved resistance to degradation. Degradation of a polycarbonate can significantly reduce the molecular weight of the polycarbonate, thereby affecting physical, chemical, and mechanical properties, including melt viscosity and processing performance of the polycarbonate composition.

Such degradation can be reduced or eliminated by using an elastomer-modified graft copolymer as impact modifier that has been made by a process comprising adjusting the pH of a latex of the elastomer-modified graft copolymer before its coagulation and later combination with the polycarbonate component. Without wishing to be bound by theory, the present invention is believed to prevent polycarbonate degradation as follows. Emulsion polymerization processes for preparing an elastomer-modified graft copolymer have commonly employed tetrasodium pyrophosphate as an electrolyte. Residual amounts of the electrolyte can remain in the copolymer when used as an impact modifier. The amount of residual electrolyte can depend to some extent on the method of recovering the graft copolymer. For example, spray drying of the graft copolymer or the use of salt coagulants or acid coagulants which are employed in obtaining the final impact modifiers, can affect the amount of electrolyte remaining in the final product. It is believed, however, that the presence of electrolytes such as tetrasodium pyrophosphate can adversely affect the stability of a polycarbonate composition modified with the graft copolymer for improved impact resistance. The pH adjustment used in the present invention, during preparation of the graft copolymer, is believed to prevent or reduce the adverse effects of the residual electrolyte by preventing its chelating activity in the impact resistant polycarbonate composition, which potential chelating activity is, in turn, believed to contribute to degradation or other adverse effects on hydrostability of the polycarbonate base component of the composition.

Polycarbonates useful in preparing polycarbonate compositions are generally aromatic polycarbonates. A "polycarbonate" means compositions having repeating structural carbonate units of formula (1)

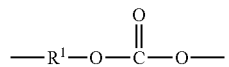

(1)

in which at least 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from a dihydroxy compound of the formula HO—$R^1$—OH, in particular of formula (2)

wherein each of $A^1$ and $A^2$ is a monocyclic divalent aromatic group and $Y^1$ is a single bond or a bridging group having one or more atoms that separate $A^1$ from $A^2$. In an embodiment, one atom separates $A^1$ from $A^2$. Specifically, each $R^1$ can be derived from a dihydroxy aromatic compound of formula (3)

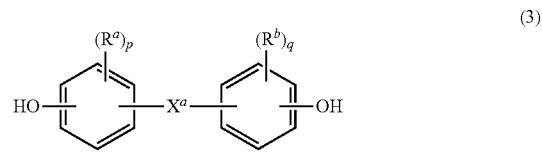

(3)

wherein $R^a$ and $R^b$ are each independently a halogen, $C_{1-12}$ alkoxy, or $C_{1-12}$ alkyl; and p and q are each independently integers of 0 to 4. It will be understood that $R^a$ is hydrogen when p is 0, and likewise $R^b$ is hydrogen when q is 0. Also in formula (3), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In an embodiment, p and q is each 1, and $R^a$ and $R^b$ are each a $C_{1-3}$ alkyl group, specifically methyl, disposed meta to the hydroxy group on each arylene group.

In an embodiment, $X^a$ is a substituted or unsubstituted $C_{3-18}$ cycloalkylidene, a $C_{1-25}$ alkylidene of formula —C($R^e$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

In another embodiment, $X^a$ is a $C_{1-18}$ alkylene group, a $C_{3-18}$ cycloalkylene group, a fused $C_{6-18}$ cycloalkylene group, or a group of the formula —$B^1$-G-$B^2$— wherein $B^1$ and $B^2$ are the same or different $C_{1-6}$ alkylene group and G is a $C_{3-12}$ cycloalkylidene group or a $C_{6-16}$ arylene group. For example, $X^a$ can be a substituted $C_{3-18}$ cycloalkylidene of formula (4)

(4)

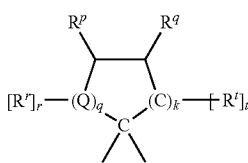

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and i is 0, the ring as shown in formula (4) contains 4 carbon atoms, when k is 2, the ring as shown in formula (4) contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Bisphenols (3) can be used in the manufacture of polycarbonates containing phthalimidine carbonate units of formula (4a)

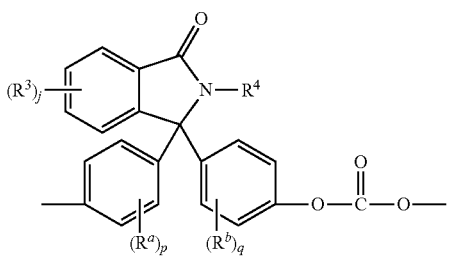
(4a)

wherein $R^a$, $R^b$, p, and q are as in formula (3), $R^3$ is each independently a $C_{1-6}$ alkyl group, j is 0 to 4, and $R_4$ is a $C_{1-6}$ alkyl, phenyl, or phenyl substituted with up to five $C_{1-6}$ alkyl groups. In particular, the phthalimidine carbonate units are of formula (4b)

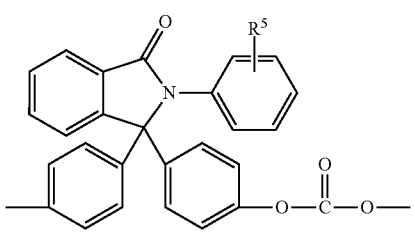
(4b)

wherein $R^5$ is hydrogen or a $C_{1-6}$ alkyl. In an embodiment, $R^5$ is hydrogen. Carbonate units (4a) wherein $R^5$ is hydrogen can be derived from 2-phenyl-3,3'-bis(4-hydroxy phenyl)phthalimidine (also known as N-phenyl phenolphthalein bisphenol, or "PPPBP") (also known as 3,3-bis(4-hydroxyphenyl)-2-phenylisoindolin-1-one).

Other bisphenol carbonate repeating units of this type are the isatin carbonate units of formula (4c) and (4d)

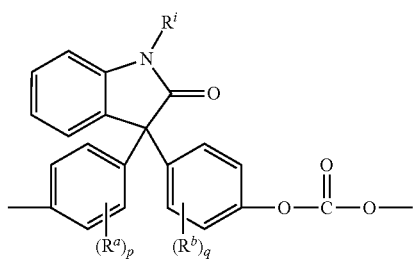
(4c)

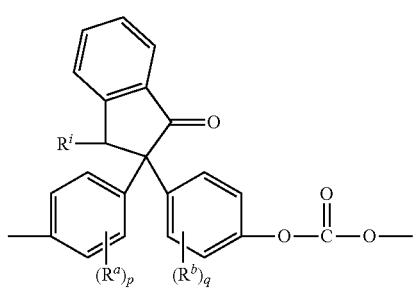
(4d)

wherein $R^a$ and $R^b$ are each independently $C_{1-12}$ alkyl, p and q are each independently 0 to 4, and $R^1$ is $C_{1-12}$ alkyl, phenyl, optionally substituted with 1 5 to $C_{1-10}$ alkyl, or benzyl optionally substituted with 1 to 5 $C_{1-10}$ alkyl. In an embodiment, $R^a$ and $R^b$ are each methyl, p and q are each independently 0 or 1, and $R^1$ is $C_{1-4}$ alkyl or phenyl.

Examples of bisphenol carbonate units derived from bisphenols (4) wherein $X^a$ is a substituted or unsubstituted $C_{3-18}$ cycloalkylidene include the cyclohexylidene-bridged, alkyl-substituted bisphenol of formula (4e)

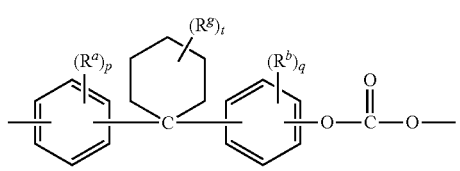
(4e)

wherein $R^a$ and $R^b$ are each independently $C_{1-12}$ alkyl, $R^g$ is $C_{1-12}$ alkyl, p and q are each independently 0 to 4, and t is 0 to 10. In a specific embodiment, at least one of each of $R^a$ and $R^b$ are disposed meta to the cyclohexylidene bridging group. In an embodiment, $R^a$ and $R^b$ are each independently $C_{1-4}$ alkyl, $R^g$ is $C_{1-4}$ alkyl, p and q are each 0 or 1, and t is 0 to 5. In another specific embodiment, $R^a$, $R^b$, and $R^g$ are each methyl, r and s are each 0 or 1, and t is 0 or 3, specifically 0.

Examples of other bisphenol carbonate units derived from bisphenol (3) wherein $X^b$ is a substituted or unsubstituted $C_{3-18}$ cycloalkylidene include adamantyl units (4f) and units (4g)

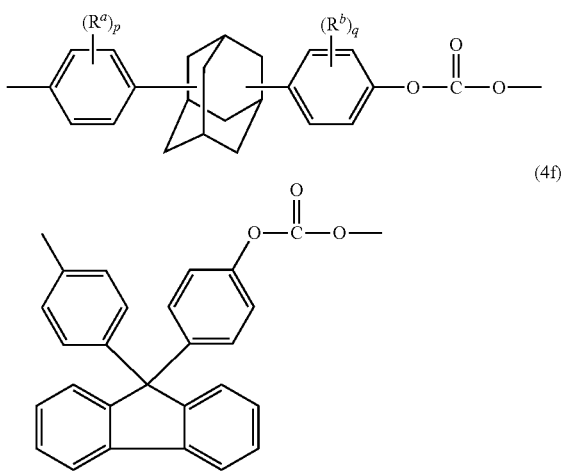

(4g)

(4f)

wherein $R^a$ and $R^b$ are each independently $C_{1-12}$ alkyl, and p and q are each independently 1 to 4. In a specific embodiment, at least one of each of $R^a$ and $R^b$ are disposed meta to the cycloalkylidene bridging group. In an embodiment, $R^a$ and $R^b$ are each independently $C_{1-3}$ alkyl, and p and q are each 0 or 1. In another specific embodiment, $R^a$, $R^b$ are each methyl, p and q are each 0 or 1. Carbonates containing units (4a) to (4g) are useful for making polycarbonates with high glass transition temperatures ($T_g$) and high heat distortion temperatures.

Other useful aromatic dihydroxy compounds of the formula HO—R'—OH include compounds of formula (6)

(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyehexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl)methane, 1,1-bis(4-hydroxyphenyl)ethane, 2,2-bis(4-hydroxyphenyl) propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-2-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (2).

The polycarbonates can have an intrinsic viscosity, as determined in chloroform at 25° C., of 0.3 to 1.5 deciliters per gram (dl/g), specifically 0.45 to 1.0 dl/g. The polycarbonates can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute.

In an embodiment, the polycarbonate has flow properties useful for the manufacture of thin articles. Melt volume flow rate (often abbreviated MFR) measures the rate of extrusion of a thermoplastics through an orifice at a prescribed temperature and load. Combinations of polycarbonates of different flow properties can be used to achieve the overall desired flow property. A high molecular weight aromatic polycarbonate having a relatively high weight average molecular weight can be combined with a relatively low molecular weight aromatic polycarbonate, with a difference of 1,000 to 50,000, specifically 2,000 to 25,000 g/mol. For example, a high molecular weight aromatic polycarbonate having a weight average molecular weight of 27,000 to 100,000 can be combined with a relatively low molecular weight aromatic polycarbonate having a weight average molecular weight of less than 27,000, for example 15,000 to 25,000.

"Polycarbonates" includes homopolycarbonates (wherein each $R^1$ in the polymer of formula (1) is the same), copolymers comprising different $R^1$ moieties in the carbonate ("copolycarbonates"), copolymers comprising carbonate units and other types of polymer units, such as ester units, and combinations comprising at least one of homopolycarbonates and/or copolycarbonates.

Polycarbonates can be manufactured by processes such as interfacial polymerization and melt polymerization. Although the reaction conditions for interfacial polymerization can vary, an process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., 8 to 12. The most commonly used water immiscible solvents include methylene chloride, 1,2-dichloroethane, chlorobenzene, toluene, and the like.

Carbonate precursors include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3—[CH_3(CH_2)_3]_3NX$, and $CH_3—[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst can be 0.1 to 10 wt. % based on the weight of bisphenol in the phosgenation mixture. In another embodiment an effective amount of phase transfer catalyst can be 0.5 to 2 wt. % based on the weight of bisphenol in the phosgenation mixture.

All types of polycarbonate end groups are contemplated as being useful in the polycarbonate composition, provided that such end groups do not significantly adversely affect desired properties of the compositions.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt. %. Mixtures comprising linear polycarbonates and branched polycarbonates can be used.

A chain stopper (also referred to as a capping agent) can be included during polymerization. The chain stopper limits molecular weight growth rate, and so controls molecular weight in the polycarbonate. Chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes can be used to make the polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl) carboxylate, bis(4-acetylphenyl)carboxylate, or a combination comprising at least one of the foregoing esters. In addition, useful transesterification catalysts can include phase transfer catalysts of formula $(R^3)_4Q^+X$, wherein each $R^3$, Q, and X are as defined above. Transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

The polycarbonate composition further comprises an elastomer-modified graft copolymer comprising (i) an elastomeric (i.e., rubbery) polymer substrate. specifically having a $T_g$ less than or equal to 10° C., more specifically less than or equal to −10° C., or even more specifically −40° to −80° C., and (ii) a rigid polymeric superstrate grafted to the elastomeric polymer substrate. As is known, elastomer-modified graft copolymers can be prepared by first providing the elastomeric polymer, then polymerizing the constituent monomer or monomers (comonomers) of the rigid phase in the presence of the elastomer to obtain the graft copolymer. The grafts can be attached as graft branches or as shells to an elastomer core. The grafted monomers or shell can merely physically encapsulate the core, or the shell can be partially or essentially completely grafted to the core, and can partially or essentially completely surround the core or elastomeric substrate.

Materials for use as the elastomer phase include, for example, conjugated diene rubbers; copolymers of a conjugated diene with less than or equal to 50 wt. % of a copolymerizable monomer; elastomeric copolymers of $C_{1-8}$ alkyl (meth)acrylates with butadiene and/or styrene; or combinations comprising at least one of the foregoing elastomers.

A specific elastomer-modified graft copolymer, for use as an impact modifier, is an acrylonitrile-butadiene-styrene (ABS) impact modifier wherein the butadiene substrate is prepared using above-described electrolyte, specifically the above-described electrolyte and emulsifier in combination. Other examples of elastomer-modified graft copolymers in addition to ABS include but are not limited to acrylonitrile-styrene-butyl acrylate (ASA), methyl (meth)acrylate-butadiene-styrene (MBS), methyl (meth)acrylate-butadiene (MB), methyl (meth)acrylate-acrylonitrile-butadiene-styrene (MABS), and acrylonitrile-ethylene-propylene-diene-styrene (AES). Conjugated diene monomers for preparing the elastomer phase of an elastomer-modified graft copolymer include those of formula (17)

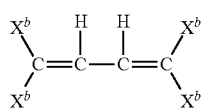

(17)

wherein each $X^b$ is independently hydrogen, $C_1$-$C_5$ alkyl, or the like. Examples of conjugated diene monomers that can be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as combinations comprising at least one of the foregoing conjugated diene monomers. Specific conjugated diene homopolymers include polybutadiene and polyisoprene.

Copolymers of a conjugated diene rubber can also be used, for example those produced by aqueous radical emulsion polymerization of a conjugated diene and at least one monomer copolymerizable therewith. Monomers that are useful for copolymerization with the conjugated diene include monovinylaromatic monomers containing condensed aromatic ring structures, such as vinyl naphthalene, vinyl anthracene, and the like, or monomers of formula (18)

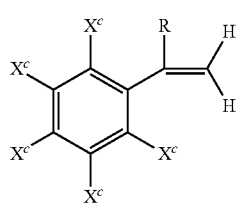

(18)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkylaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Monovinylaromatic monomers that can be used include styrene, 3-methylstyrene, 3,5-diethylstyrene, 4-n-propylstyrene, alpha-methylstyrene, alpha-methyl vinyl-toluene, alpha-chlorostyrene, alpha-bromostyrene, dichlorostyrene, dibromostyrene, tetra-chlorostyrene, and the like, and combinations comprising at least one of the foregoing compounds. Styrene and/or alpha-methylstyrene can be used as monomers copolymerizable with the conjugated diene monomer.

Other monomers that can be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the generic formula (19)

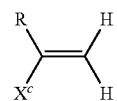

(19)

wherein R is hydrogen, $C_1$-$C_5$ alkyl, bromo, or chloro, and X' is cyano, $C_1$-$C_{12}$ alkoxycarbonyl, $C_1$-$C_{12}$ aryloxycarbonyl, hydroxy carbonyl, or the like. Examples of monomers of formula (8) include acrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl(meth)acrylate, isopropyl(meth)acrylate, 2-ethylhexyl(meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Combinations of the foregoing monovinyl monomers and monovinylaromatic monomers can also be used.

(Meth)acrylate monomers for use in the elastomeric phase can be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers can optionally be polymerized in admixture with less than or equal to 15 wt. % of comonomers of formulas (7), (8), or (9), based on the total monomer weight. Comonomers include but are not limited to butadiene, isoprene, styrene, methyl methacrylate, phenyl methacrylate, phenethylmethacrylate, N-cyclohexylacrylamide, vinyl methyl ether or acrylonitrile, and combinations comprising at least one of the foregoing comonomers. Optionally, less than or equal to 5 wt. % of a polyfunctional crosslinking comonomer can be present, based on the total monomer weight. Such polyfunctional crosslinking comonomers can include, for example, divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl(meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase can be polymerized using continuous, semi-batch, or batch processes. A method of preparing a polycarbonate composition having improved resistance to polymer degradation can comprise carrying out emulsion polymerization of a monomer mixture comprising a diene or other unsaturated monomer for making the elastomer phase in the presence of an electrolyte, for example, tetrasodium pyrophosphate or the like, followed by pH adjustment of the grafted copolymer.

In particular, the impact modified polycarbonate composition having improved resistance to polymer degradation can be made by a process comprising carrying out emulsion polymerization of a monomer mixture comprising an unsaturated monomer such as a diene monomer to form an elastomer phase, for example a diene polymer; subsequently grafting monomers onto the elastomer phase or diene polymer to form a latex composition comprising an elastomer-modified graft copolymer and having an alkaline pH; coagulating the latex of the elastomer-modified graft copolymer product; and admixing the elastomer-modified graft copolymer with an aromatic polycarbonate; wherein prior to coagulation and admixture, the pH of the composition comprising the is elastomer-modified graft copolymer is adjusted with an acid to obtain a pH of about 3.0 to about 6.8. Specifically, an acid, not a buffer, is introduced to adjust the pH. Buffers comprising an alkali metal salt, specifically a phosphate buffer, can be avoided. The presence of compounds in the latex that can form a buffer in situ to some extent is not necessarily excluded, if added prior to the formation of the latex and/or present in relatively insignificant or minor amounts in terms of pH adjustment.

In addition to the specified pH adjustment, the stability of the polycarbonate composition can be further improved or enhanced by using an impact modifier that is essentially free of certain emulsifiers. In particular, the foregoing types of elastomer-modified graft copolymer can be prepared by an emulsion polymerization process that is free of the alkali metal salts of fatty acids, alkali metal carbonates, amines, ammonium salts, and other basic materials. Specifically, the elastomer-modified graft copolymer can be prepared free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials have been commonly used as surfactants in emulsion polymerization, but can catalyze transesterification and/or degradation of polycarbonates. Instead, ionic sulfate, sulfonate or phosphate surfactants can be used in preparing the impact modifiers, particularly the elastomeric substrate portion of the impact modifiers. Useful surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, or a combination comprising at least one of the foregoing, which compounds can be substituted or unsubstituted with further groups, including additional sulfonate, sulfate, phosphate, or silicate groups. The compounds can comprise alkyl groups having 1 to 20 carbon atoms, specifically 1 to 6 carbon atoms, and aryl groups having 6 to 12 carbon atoms. A specific surfactant is a $C_{6-16}$, specifically a $C_{8-12}$ alkyl sulfonate. Another specific surfactant is a substituted alkyl aryl sulfonate, specifically a substituted diaryloxide disulfonate, more specifically alkyl diphenyloxide disulfonate, in which a phenyl group is substituted with a phenoxy group substituted with a second sulfonate group and in which the aryl groups are substituted with alkyl groups.

Examples of such surfactants include, but are not limited thereto, sodium dodecyl benzene sulfonate, potassium octyl benzene sulfonate, sodium lauryl sulfate, sodium alkyl naphthyl sulfonates, calcium decyl benzene sulfonate, $C_8$-$C_{16}$ alkylated diphenylether sodium disulfonates, potassium hexyl phosphate, sodium decylphosphate, and mixtures thereof, and the like. An example of a dimethyl substituted diaryloxide disulfonate is commercially available under the trademark DOWFAX 2A1.

During preparation of the elastomer-modified graft copolymer, the elastomer substrate, or diene polymer, can be agglomerated to increase the average particle size (for example, to an average particle size of 50 to 1000 nm), wherein monomers are grafted onto the agglomerated diene polymer. The grafting can occur in the presence of an initiator, redox system, and chain transfer agent to obtain the elastomer-modified graft copolymer. Typically the unagglomerated average particle size is about 30 to 150 nm, more specifically about 75 to 100 nm.

The particle size of the elastomer substrate is not critical. For example, an average particle size of 0.001 to 25 micrometers (1 to 25000 nanometers), specifically 0.01 to 15 micrometers (10 to 15000 nm), or even more specifically 0.1 to 8 micrometers (100 to 8000 nm) can be used. In one embodiment, the a polybutadiene elastomer substrate can be agglomerated to an average particle size of about 50 to 1000 nm, specifically 100 to 600 nm, more specifically 200 to 400 nm. Particle size can be measured by simple light transmission methods (Dynamic Light scattering or DLS), which can be estimated (with some variance) also by capillary hydrodynamic chromatography (CHDF).

The elastomer phase (or substrate) can be a particulate, moderately cross-linked conjugated butadiene or $C_{4-6}$ alkyl acrylate rubber. In one embodiment, a gel content greater than 70% is used. Specifically, combinations of butadiene with styrene and/or $C_{4-6}$ alkyl acrylate rubbers can be used.

The elastomeric phase can comprise 5 to 95 wt. % of the total graft copolymer, more specifically 20 to 90 wt. %, and even more specifically 40 to 85 wt. % of the elastomer-modified graft copolymer, the remainder being the rigid graft phase. In one embodiment, the weight ratio of the elastomer substrate, or diene polymer, to the superstrate, or graft polymer, is about 2:1 to 1:1.5, more specifically 1.5:1 to 1:1.

The rigid phase of the elastomer-modified graft copolymer can be formed by graft polymerization of one or more monomers, including a combination comprising a monovinylaromatic monomer and optionally at least one comonomer in the presence of at least one elastomeric polymer substrates. The above-described monovinylaromatic monomers of formula (8) can be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Useful comonomers include, for example, the above-described monovinylic monomers and/or monomers of the general formula (9). In an embodiment, R in formula (9) is hydrogen or $C_1$-$C_2$ alkyl, and $X^c$ is cyano or $C_1$-$C_{12}$ alkoxycarbonyl. Specific comonomers for use in the rigid phase include acrylonitrile, methacrylonitrile, methyl (meth)acrylate, ethyl (meth)acrylate, n-propyl(meth)acrylate, isopropyl (meth)acrylate, and the like, and combinations comprising at least one of the foregoing comonomers.

The relative ratio of monovinylaromatic monomer and comonomer in the rigid graft phase can vary widely depending on the type of elastomer substrate, type of monovinylaromatic monomers, type of comonomers, and the desired properties of the impact modifier. The rigid phase can generally comprise less than or equal to 100 wt. % of monovinyl aromatic monomer, specifically 30 to 100 wt. %, more specifically 50 to 90 wt. % monovinylaromatic monomer, with the balance of the rigid phase being comonomers.

In one embodiment, the elastomer-modified graft copolymer is made by a process in which an agglomerated polybutadiene latex is grafted with a monomer mixture comprising styrene and optionally comprising a monomer selected from the group consisting of methacrylate, methyl methacrylate, acrylonitrile, and combinations thereof. In the monomer mixture, styrene and acrylonitrile can be in a ratio of 5:1 to 1:1, specifically, 4:1 to 2:1, more specifically 3.4:1 to 1.5:1 by weight ratio. Thus, for example, the graft superstrate can be derived from 10 to 50%, specifically 15 to 25% by weight of acrylonitrile monomer.

In one embodiment, the graft superstrate formed by the monomer mixture is capable of readily wetting the polycarbonate in the polycarbonate composition, in which the elastomeric substrate comprises repeat units derived from butadiene, and the non-elastomeric superstrate is a copolymer comprising repeat units derived from a monovinylaromatic monomer. The elastomer phase, or diene polymer, can comprise 20% to 80% by weight, specifically about 50% by weight of the elastomer-modified graft copolymer. The method can then further comprise coagulating the elastomer-modified graft copolymer with a salt and then concentrating and drying the coagulated elastomer-modified graft copolymer.

Following grafting of the superstrate onto the emulsion polymerized elastomer phase to obtain a latex of the elastomer-modified graft copolymer product, but before coagulation of the grafted product to obtain a coagulated elastomer-modified graft copolymer and subsequent admixture of the coagulated elastomer-modified graft copolymer with the aromatic polycarbonate, the composition comprising the elastomer-modified graft copolymer product is subjected to treatment with an acid. Specifically, the acid can be used to lower the pH of the latex by at least about 0.5 units, specifically to lower the pH by 0.75 to 5 units. More specifically, the acid can be used to lower the pH by about 1.0 to 4.0 units, most specifically 1.1 to 3.8 units of pH. In particular, before pH adjustment with the acid, the pH of the latex can be basic or slightly basic, and the pH can be adjusted to about 3.0 to about 6.8, specifically to about 3.5 to 6.0. The pH adjustment can take place without introducing, i.e., effectively in the absence of an external buffer (some in situ buffering can possibly take place due to other additives present in the composition, but the effect of that would be minor or insignificant compared to the acid adjustment).

In particular, the latex composition comprising the elastomer-modified graft copolymer, during its preparation, is typically alkaline, i.e. can have a pH above 7.0 and below 8.0, specifically a pH of about 7.1 to 7.5, more specifically a pH of about 7.3, prior to pH adjustment with acid. Following adjustment of the pH by about 0.5 units to about 5 units, the pH can be acidic or slightly acidic.

The acid employed for the pH adjustment can have a $pK_a$ of less than 5.0, specifically less than 3.0, more specifically less than 2.0. Accordingly, the acid can be a mineral acid, optionally substituted with an alkyl or trifluoroalkyl group, for example methyl or trifluoromethyl that completely ionizes in water or an acid that is an organic acid that does not completely ionize in water.

Strong acids include, for example, hydrochloric acid (HCl), hydroiodic acid (HI), hydrobromic acid (HBr), hydrofluoric acid (HF), perchloric acid ($HClO_4$), nitric acid ($HNO_3$), nitrous acid ($HNO_2$), chromic acid ($H_2CrO_4$), and sulfuric acid ($H_2SO_4$), sulfurous acid ($H_2SO_3$), phosphoric acid ($H_3PO_4$), trifluoromethanesulfonic acid ($CF_3SO_3H$), and alkylsulfonic acid ($CH_3SO_3H$). Specifically, a mineral acid such as sulfuric acid can be used. Alternatively, the acid can be a relatively weak acid selected from the group consisting of carboxylic acids or carboxylic anhydrides and combinations thereof, which compounds can be optionally substituted with one or more substituents selected from the group consisting of nitro, halogen, trifluoroalkyl, hydroxy, and substituted or unsubstituted phenyl. The alkyl group in the acid can have 1 to 20 carbon atoms, specifically 1 to 4 carbon atoms.

The composition comprising the elastomer-modified graft polymer, before admixture with the aromatic polycarbonate, is essentially free of an externally added buffer comprising an alkali metal, specifically essentially free of an externally added buffer comprising an alkali metal and phosphoric acid salts, more specifically essentially free of a buffer comprising monosodium phosphate and disodium phosphate.

Finally, the elastomer-modified graft copolymer can be admixed with an aromatic polycarbonate, optionally further with a polymeric flow promoter. The polymeric flow promoter can readily blend with the elastomer-modified graft copolymer and increase its melt flow rate without adversely affecting the desired properties of the composition.

For example, a polymeric flow promoter can comprise repeat units derived from monomers selected from the group consisting of methyl (meth)acrylate, styrene, acrylonitrile, and combinations thereof. Polymeric flow promoters can include styrene-acrylonitrile copolymers, poly(methyl methacrylate), polystyrene, methyl methacrylate-styrene-acrylonitrile, and combinations thereof. Specifically, the polycarbonate composition can comprise a flow promoter that is a styrene-acrylonitrile copolymer.

The polymeric flow promoter can be produced at the same time as the elastomer-modified graft copolymer, using excess monomers from the graft superstrate. The polymeric flow promoter can form a separate matrix or continuous phase of ungrafted rigid polymer or "graft copolymer" along with the elastomer-modified graft copolymer. Alternatively, the polymeric flow promoter can be prepared or obtained independently and introduced to the elastomer-modified graft copolymer later, for example, during compounding with the aromatic polycarbonate. It can be prepared using emulsion, suspension or bulk/mass polymerization techniques.

In one embodiment, the polymeric flow promoter can be obtained during preparation of the elastomer-modified graft copolymer composition, wherein "free" styrene-acrylonitrile copolymer ("free SAN"), i.e., styrene-acrylonitrile copolymer that is not grafted onto another polymeric chain is also prepared. In a particular embodiment, the free styrene-acrylonitrile copolymer can have a molecular weight of 50,000 to 200,000 Daltons on a polystyrene standard molecular weight scale and can comprise various proportions of styrene to acrylonitrile. For example, free SAN can comprise 75 weight percent styrene and 25 weight percent acrylonitrile based on the total weight of the free SAN copolymer. Free SAN can optionally be present by virtue of the addition of another grafted rubber impact modifier in the composition that contains free SAN, and/or free SAN can by present independent of impact modifiers in the composition.

The impact resistant polycarbonate composition can comprise, in admixture, about 20 to about 90 weight percent of the aromatic polycarbonate and about 80 to about 10 weight percent of the combined elastomer-modified graft copolymer and optional polymeric flow promoter, based on the total weight of polycarbonate, elastomer-modified graft copolymer and optional polymeric flow promoter. Specifically, the polycarbonate composition can comprise, in admixture, about 40 to about 80 weight percent of the aromatic polycarbonate and about 60 to about 20 weight percent of, in combination, elastomer-modified graft copolymer and optional polymeric flow promoter, based on the total weight of polycarbonate, elastomer-modified graft copolymer and optional polymeric flow promoter.

More specifically, the polycarbonate composition can comprise, in admixture, about 48 to about 75 weight percent of the aromatic polycarbonate and about 52 to about 25 weight percent of (in total) elastomer-modified graft copolymer and optional polymeric flow promoter, based on the total weight of polycarbonate, elastomer-modified graft copolymer and optional polymeric flow promoter.

The ratio of elastomer-modified graft copolymer to optional polymeric flow promoter, if present, can be 3:1 to 1:3, specifically 2:1 to 1:2, more specifically 1.5:1 to 1:1.5. Typically, 40 to 95 wt. % elastomer-modified graft copolymer can be combined with 5 to 65 wt. % polymeric flow promoter (for example, graft copolymer), based on the total weight of both. In another embodiment, 50 to 85 wt. %, more specifically 75 to 85 wt. % of the elastomer-modified graft copolymer can be combined with 15 to 50 wt. %, more specifically 15 to 25 wt. % polymeric flow promoter such as separate graft copolymer, based on the total weight of both. For example, the polycarbonate composition can comprise styrene-acrylonitrile copolymer (free SAN) that is present in the amount of 1 to 30 weight percent, based on the total weight of polycarbonate, elastomer-modified graft copolymer, and styrene-acrylonitrile copolymer.

In view of the above, an impact resistant polycarbonate composition having improved resistance to polymer degradation can comprise, in admixture, about 48 to about 75 weight percent of an aromatic polycarbonate and about 52 to about 25 weight percent of an elastomer-modified graft copolymer and optional polymeric flow promoter, based on the total weight of aromatic polycarbonate elastomer-modified graft copolymer, and polymeric flow promoter, wherein the elastomer-modified graft copolymer is prepared by a process comprising emulsion polymerization of at least butadiene or other diene monomer in the presence of a surfactant selected from the group consisting of substituted or unsubstituted alkyl sulfonates, alkylaryl sulfonate, alkyl sulfates, alkylaryl sulfates, alkyl phosphate, and alkylaryl phosphates, and mixtures thereof (wherein the alkyl group has 1-20 carbon atoms and the unsubstituted aryl groups have 6-12 carbon atoms), thereby forming an diene polymer; and grafting one or more monomers onto the diene polymer, thereby forming a latex composition comprising an elastomer-modified graft copolymer product; and coagulating the latex composition wherein, prior to coagulation, adjusting the pH of the latex composition comprising the elastomer-modified graft copolymer product by introducing an acid, not a buffer, to obtain a pH of about 3.0 to about 6.8, wherein the acid has a $pK_a$ of less than 5.0.

In addition to the polycarbonate and elastomer-modified graft copolymer impact modifier, the compositions can include various additives ordinarily incorporated into polymer compositions of this type, with the proviso that the additives are selected so as to not significantly adversely affect the desired properties of the thermoplastic composition. Combinations of additives can be used. The foregoing additives (except any fillers) are generally present in an amount from 0.005 to 20 wt. %, specifically 0.1 to 10 wt. %, based on the total weight of the composition.

For example, antioxidant additives can include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants can be used in amounts of 0.01 to 0.1 parts by weight, based on 100 parts by weight of the total polymer in the composition.

To prepare the final impact resistant polycarbonate composition, the components can be mixed by any known methods. Typically, there are two distinct mixing steps: a premixing step and a melt mixing ("melt blending") step. In the premixing step, the dry ingredients are mixed together. The premixing is typically performed using a tumbler mixer or ribbon blender. However, if desired, the premix may be manufactured using a high shear mixer such as a Henschel® mixer or similar high intensity device. The premixing is typically followed by melt mixing in which the premix is melted and mixed again as a melt. Alternatively, the premixing may be omitted, and raw materials may be added directly into the feed section of a melt mixing device, preferably via multiple feeding systems. In melt mixing, the ingredients are typically melt kneaded in a single screw or twin screw extruder, a Banbury mixer, a two roll mill, or similar device. The examples are extruded using a twin screw type extruder, where the mean residence time of the material is from about 20 seconds to about 30 seconds, and where the temperature of the different extruder zones is from about 200° C. to about 290° C.

In a specific embodiment, the impact resistant polycarbonate compositions are prepared by blending the components of the composition by placing into an extrusion compounder to produce molding pellets. The components are dispersed in a matrix in the process. In another procedure, the components are mixed by dry blending, and then fluxed on a mill and comminuted, or extruded and chopped. The composition and any optional components can also be mixed and directly molded, e.g., by injection or transfer molding techniques. Preferably, all of the components are freed from as much water as possible. In addition, compounding is carried out to ensure that the residence time in the machine is short; the temperature is carefully controlled; the friction heat is utilized; and an intimate blend between the components is obtained.

In one embodiment, the components are pre-compounded, pelletized, and then molded. Pre-compounding can be carried out in conventional equipment. For example, after pre-drying the composition (e.g., for four hours at 120° C.), a single screw extruder can be fed with a dry blend of the ingredients, the screw employed having a long transition section to ensure proper melting. Alternatively, a twin screw extruder with intermeshing co-rotating screws can be fed with resin and additives at the feed port and reinforcing additives (and other additives) can be fed downstream. In either case, a generally suitable melt temperature will be 200° C. to 290° C. The pre-compounded composition can be extruded and cut up into molding compounds such as conventional granules, pellets, and the like by standard techniques. The composition can then be molded in any equipment conventionally used for thermoplastic compositions, such as a Newbury or van Dorn type injection-molding machine with conventional cylinder temperatures, at 230° C. to 280° C., and conventional mold temperatures at 55° C. to 95° C.

The impact resistant polycarbonate compositions of the present invention can advantageously obtain a balance of properties characterized by, after aging molded ISO Tensile bars of the composition in an oven for 1000 hours at 90°±2° C. and 95±3% RH, a melt flow rate (MFR) that does not change by more than 5.0 g/10 min units measured in accordance with ISO 1133 standard at 230° C. using a 3.8 kg load and 300 sec dwell time. Also, the impact resistant polycarbonate compositions of the present invention can advantageously obtain a balance of properties characterized by, after aging molded ISO tensile bars of the composition in an oven for 1000 hours at 90°±2° C. and 95±3% RH, a melt flow rate (MFR) that changes at least 3 g/10 min less than, specifically at least 6 g/10 min less than, more specifically at least 7.5 g/10 min less than the same composition in which there was no pH adjustment. Alternatively, the impact resistant polycarbonate compositions of the present invention can be characterized by, after aging molded ISO Tensile bars of the composition in an oven for 1000 hours at 90°±2° C. and 95±3% RH, a melt flow rate (MFR) that changes at least 3 g/10 min less than, specifically at least 6 g/10 min less than, more specifically at least 7.5 g/10 min less than the same composition in which the same pH adjustment is instead made with a buffer comprising monosodium phosphate and disodium phosphate.

The Melt flow rate (MFR) of a polymer composition is a measure of the extrusion rate of the polymeric melt through a die with a specified length and diameter under set conditions of temperature and loads. Such measurements are made according to ISO 1133 standard at 230° C. using a 3.8 kg load and 300 sec dwell time, which standard is hereby incorporated by reference. This melt flow rate technique is based on the principle that flow increases with decreasing polymer viscosity for a given temperature and load test condition. A higher MFR value indicates a lower viscosity under an applied stress (load or weight in kg) and generally increases as the molecular weight of a particular type of polymer decreases. Thus, since decreasing molecular weight is indicative of polymer degradation due to hydrolysis, heat and/or transesterification, an increase in MFR can be viewed as correspond to a drop in weight average molecular weight ($M_w$) and an increase in polymer degradation.

Melt flow rate methods are described in *Rheology—Principles, Measurements and Applications* by C. W. Macosko (ISBN 0-471-18575-2), *Rheological Techniques* by R. W. Whorlow (ISBN 0-13-775370-5), *Flow Properties of Polymer Melts* by J. A. Brydson, (ISBN 0-59-205458-6), all three of which are hereby incorporated by reference.

The final polycarbonate compositions can be shaped into an article by various techniques known in the art such as injection molding, extrusion, injection blow molding, and gas assist molding. The compositions are thus useful in the manufacture of non-electrical, electrical, or electronic parts. Articles can include the exterior or interior components of aircraft, automotive, truck, motorcycle, or other vehicles (generically "automotive parts"), including panels, quarter panels, rocker panels, trim fenders, deck lids, trunk fairings and lids, hoods, bumpers, fascia, grilles, mirror housings, cladding, wheel covers, hubcaps, door components, spoilers, instrument panels, instrument panel retainers, interior trim, emblem logos, exterior trim, and door handles, tank flaps, rocker panels, side panels, window frames, head or tail lamps, roof racks, and running boards. Articles can also include enclosures for a wide variety of electrical and telecommunication devices, for example, housing for electronic components, including power tools, home appliances, or computer components, computer accessories such as printers, copiers, or keyboards, and telecommunication devices, for example, mobile phones, radios, or fax machines. Still further applications can include, but are not limited to, building and construction applications, display items, signs, and like applications.

This invention is further illustrated by the following Examples, which are not intended to limit the claims.

EXAMPLES

Materials

The following materials used for the examples and comparative Examples are shown in Table 1. In the Tables below, compositions are given by weight based on parts by weight of the total composition, unless otherwise indicated.

TABLE 1

| Component | Chemical Description [CAS Reg. No.] |
|---|---|
| PC1 | Bisphenol A polycarbonate resin, interfacial polymerization, Mw about 30,000 g/mol [CAS: 25971-63-5] from SABIC Innovative Plastics |
| PC2 | Bisphenol A polycarbonate resin, interfacial polymerization, [CAS: 25971-63-5], Mw about 23,000 g/mol from SABIC Innovative Plastics |
| ABS | Acrylonitrile-butadiene-styrene graft copolymer as synthesized |
| SAN | High flow styrene-acrylonitrile copolymer, 6.2 g/10 min MFR at 190° C./2.16 kg, 25% AN monomer mole ratio from SABIC Innovative Plastics |
| SDBS | Sodium dodecybenzenesulfonate (SDBS) surfactant |
| TSPP | Tetrasodium pyrophosphate ($Na_4P_2O_7$) |
| $H_2SO4$ | Sulfuric Acid |
| TDMM | t-Dodecylmercaptan (TDDM) as chain-transfer agent |
| $K_2S_2O_8$ | Potassium persulfate |
| CHP | Cumene hydroperoxide initiator |
| REDOX | Redox system (ferrous sulfate)/(disodium ethylenediamine tetraacetate)/(sodiumformaldehyde sulfoxylate) |

Comparative Examples 1-3 and Examples 4-6

The purpose of the Examples and Comparative Examples is to demonstrate the unique performance of an impact modified polycarbonate according to the present invention with respect to hydrostability, as characterized by a shift in the melt flow rate under conditions of heat and high humidity. An elastomer-modified graft copolymer, specifically an acrylonitrile-butadiene-styrene (ABS) elastomer-modified graft copolymer, was prepared as follows.

The butadiene elastomer needed for the ABS elastomer-modified graft copolymer was prepared by standard batch emulsion process using either carboxylate emulsifier or sodium dodecybenzenesulfonate (SDBS) as surfactant, tetrasodium Pyrophosphate (TSPP, $Na_4P_2O_7$) as the electrolyte to control latex viscosity, potassium persulfate as initiator, and t-dodecylmercaptan (TDDM) as chain-transfer agent. The resulting latex, which was about 80 nm in average particle size, was pressure agglomerated to about 300 nm average particle size.

The agglomerated polybutadiene rubber latex was charged at 50 to 60 parts by weight and grafted with 40 to 50 parts by weight of styrene and acrylonitrile (in 3:1 weight ratio) in a semi-batch process, using cumene hydroperoxide as initiator, (ferrous sulfate)/(disodium ethylenediamine tetraacetate)/ (sodiumformaldehyde sulfoxylate) as a redox system and TDDM as chain-transfer agent. To the resulting elastomer-modified graft copolymer latex was added an anti-oxidant emulsion of Irganox® 1076 phenolic anti-oxidant in SDBS which was then coagulated with calcium chloride.

Before the coagulation, various elastomer-modified graft copolymer latexes were treated with either a buffer of mono-sodium phosphate and disodium phosphate or with sulfuric acid. The coagulated elastomer-modified graft copolymer was centrifuged and filtered, and then dried in a fluid bed.

The elastomer-modified graft copolymer was compounded with styrene-acrylonitrile copolymer (SAN) and polycarbonate (PC) in a twin screw extruder (TSE) employing a 30 mm Werner Pfleiderer co-rotating 9-barrel TSE with a vacuum vented mixing screw, at a barrel and die head temperature between 240 and 275° C. and at a screw speed of 300 to 500 revolutions per minute (rpm). The extrudate was cooled through a water bath prior to pelletizing. Test parts were injection molded on an Engel 110T-molding machine with a set temperature of approximately 240 to 275° C.

The formulation used is shown in Table 2 below, in which the PC and elastomer-modified graft copolymer levels were maintained the same in all examples.

TABLE 2

| Component | Weight Percent |
|---|---|
| PC1 | 47.8 |
| PC2 | 20.0 |
| SAN | 15.8 |
| Elastomer-modified Graft Copolymer | 15.6 |

Standard ISO T-bars (tensile bars) were molded and were aged in an oven for 1000 hours at 90±2° C. and 95±3% relative humidity (RH). The Melt Flow Rate (MFR) was measured in accordance with ISO 1133 standard at 230° C., 3.8 kg load and 300 s dwell time on pellets cut from aged and unaged tensile bars (Type A specimen as defined in ISO 3167). The melt flow rate (MFR) of the bars, before and after aging, was measured. A shift in MFR (delta MFR or Δ MFR) of not more than 5.0 g/10 minutes after aging represented the comparative hydrostability.

Specifically, the material degradation after exposure to high temperature, high humidity aging was measured using the DaimlerChrysler Laboratory Procedure LP-463 DB-03-01 wherein molded materials were conditioned in a controlled atmosphere of 23±2° C. and 50±5 relative humidity for not less than 24 hours. The delta MFR (in grams/10 minutes) is the final MFR (aged) minus the initial MFR (unaged).

In Table 3 the results of the series of experiments are shown. The details of each elastomer-modified graft copolymer with respect to pH adjustment are also shown. Comparative Example C-1, Sample A, is a commercially available product that comprises a conventional elastomer-modified graft copolymer made with carboxylate surfactant. Comparative Examples C-2 and C-3 and Examples 4 and 5 were all made from different portions of the same elastomer-modified graft copolymer latex, made using an SDBS surfactant instated of carboxylate surfactant, so the only difference among those examples is the pH adjustment (not elastomer level, particle size, grafting, etc.). The buffer used in Comparative Example C-2 was made with mono- and di-sodium phosphate salts. Hydrostability aging was done for 1000 hours at 90±2° C. and 95±3% RH.

In particular, Table 3 shows the hydrostability test results for the various elastomer-modified graft copolymers, having no surfactant or different surfactants and different pH adjustment.

TABLE 3

| Example | Description of elastomer-modified graft copolymer | Δ MFR Shift (g/10 min) |
|---|---|---|
| C-1 (A) | Control made with carboxylate surfactant based elastomer-modified graft copolymer | 41.8 |
| C-2 (A) | SDBS-based, no pH adjustment | 8.5 |
| C-3 | SDBS-based, adjustment with buffer pH 6.0 | 23.9 |
| 4 | SDBS-based, pH adjusted to 5.5 $H_2SO_4$ | 2.8 |
| 5 | SDBS-based, pH adjusted to 3.5 $H_2SO_4$ | 3.1 |

The above results clearly show that replacing the carboxylate surfactant (C-1) with SDBS (C-2) definitely improved the hydrostability of the PC/ABS blends, but were not sufficient to meet the stricter goal. The use of a buffer to adjust pH(C-3) did not obtain the desired result. However, pH adjustment of the elastomer-modified graft copolymer latex with a mineral acid such as sulfuric acid before coagulation achieved the desired hydrostability.

To confirm the hydrostability results from the first series of experiments, further experiments were carried out, in which hydrostability was tested for various elastomer-modified graft copolymers having a different surfactants and various pH adjustments. The results are shown in Table 4.

TABLE 4

| Example | Description of elastomer-modified graft copolymer | MFR Shift (g/10 min) |
|---|---|---|
| C-1 (B) | Control made with carboxylate surfactant based elastomer-modified graft copolymer | 33.4 |
| C-2 (B) | SDBS-based, no pH adjustment | 6.6 |
| 6 | SDBS-based, adjustment with $H_2SO_4$, pH adjusted to 3.5 | 3.1 |

The above results again clearly show that replacing the carboxylate surfactant (C-1) with SDBS (C-2) improved the hydrostability of the PC/ABS blend, but was not sufficient to meet stricter goal. That can be achieved with pH adjustment of elastomer-modified graft copolymer latex with a mineral acid such as sulfuric acid before completing the coagulation (Example 6).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. An impact resistant polycarbonate polymer composition having improved resistance to polymer degradation comprising about 48 to about 75 weight percent of an aromatic polycarbonate in admixture with about 52 to about 25 weight percent of an elastomer-modified graft copolymer and optional polymeric flow promoter, based on the total weight of aromatic polycarbonate, elastomer-modified graft copolymer, and polymeric flow promoter, wherein the elastomer-modified graft copolymer is prepared by a process comprising:
- emulsion polymerizing a monomer mixture comprising at least butadiene monomer in the presence of tetrasodium pyrophosphate and a surfactant selected from the group consisting of substituted or unsubstituted alkyl sulfonates, alkylaryl sulfonate, alkyl sulfates, alkylaryl sulfates, alkyl phosphate, alkylaryl phosphates, and mixtures thereof, thereby forming a diene polymer; and
- grafting one or more monomers onto the diene polymer, thereby forming a latex composition comprising an elastomer-modified graft copolymer, which latex composition has an alkaline pH, and coagulating the latex composition preliminary to admixture with the aromatic polycarbonate;
- wherein, after emulsion polymerization and prior to coagulating the latex composition with a salt coagulant, adjusting the pH of the latex composition comprising the elastomer-modified graft copolymer by introducing an acid, not a buffer, to obtain a pH of about 3.0 to about 6.8, wherein the acid has a $pK_a$ of less than 3.0;
- wherein after aging molded ISO tensile bars of the polycarbonate composition in an oven for 1000 hours at 90±2° C. and 95±3% RH, the melt flow rate (MFR) does not change by more than 5.0 g/10 min units measured in accordance with ISO 1133 standard at 230° C. using a 3.8 kg load and 300 sec dwell time.

2. The composition of claim 1 wherein the latex comprising the elastomer-modified graft copolymer is alkaline before pH adjustment and acidic following pH adjustment and wherein the pH is adjusted to decrease the pH by an amount of from 0.5 to 5 units.

3. The composition of claim 1 wherein the acid is selected from the group consisting of hydrochloric acid, hydroiodic acid, hydrobromic acid, hydrofluoric acid, perchloric acid, nitric acid, nitrous acid, chromic acid, sulfuric acid, sulfurous acid, phosphoric acid, trifluoromethanesulfonic acid, alkylsulfonic acid, and combinations thereof.

4. The composition of claim 1 wherein the acid is sulfuric acid.

5. The composition of claim 1 wherein the elastomer-modified graft copolymer, before admixture with the aromatic polycarbonate, has not been treated with a buffer comprising an alkali metal.

6. The composition of claim 5 wherein the elastomer-modified graft copolymer, before admixture with the aromatic polycarbonate, has not been treated with a buffer comprising an alkali metal salt of phosphoric acid.

7. The composition of claim 1 wherein after aging molded ISO tensile bars of the polycarbonate composition in an oven for 1000 hours at 90±2° C. and 95±3% RH, the melt flow rate (MFR) changes at least 3 g/10 min less than the same composition in which the pH adjustment is omitted, as measured in accordance with ISO 1133 standard at 230° C. using a 3.8 kg load and 300 sec dwell time.

8. The composition of claim 1 wherein after aging molded ISO tensile bars of the composition in an oven for 1000 hours at 90±2° C. and 95±3% RH, the melt flow rate (MFR) changes at least 3 g/10 min, measured in accordance with ISO 1133 standard at 230° C. using a 3.8 kg load and 300 sec dwell time, less than the same composition in which the same pH adjustment is made with a buffer comprising monosodium phosphate and disodium phosphate.

9. The composition of claim 1 wherein the elastomer-modified graft copolymer comprises an elastomeric substrate and a non-elastomeric superstrate grafted to the elastomeric substrate.

10. The composition of claim 1 wherein the elastomer-modified graft copolymer has an agglomerated average particle size of about 50 to 1000 nm as determined by dynamic laser light scattering.

11. The composition of claim 9 wherein the elastomer-modified graft copolymer comprises, prior to grafting, a diene polymer having a glass transition temperature of 0° C. or less.

12. The composition of claim 9 wherein the elastomer-modified graft copolymer comprises a diene polymer selected from the group consisting of a polymer that is the reaction product of conjugated dienes, copolymers containing at least about 50 weight % of a conjugated diene, copolymers of alkyl acrylates with a styrene and/or butadiene, and mixtures thereof, to which diene polymer is grafted a thermoplastic polymer that is capable of wetting the polycarbonate in the composition.

13. The composition of claim 9 wherein the elastomeric substrate comprises repeat units derived from butadiene and the non-elastomeric superstrate comprises repeat units derived from a monovinylaromatic monomer.

14. The composition of claim 9 wherein the elastomer-modified graft copolymer is made by a process in which agglomerated polybutadiene latex is grafted with a monomer mixture that comprises styrene optionally in combination with a monomer selected from the group consisting of methyl acrylate, methyl methacrylate, acrylonitrile, and combinations thereof.

15. The composition of claim 14 wherein the monomer mixture comprises styrene and acrylonitrile in a ratio of 5:1 to 1:1 by weight.

16. The composition of claim 12 in which the weight ratio of the diene polymer substrate to the graft superstrate is about 2:1 to 1:1.5.

17. The composition of claim 1 wherein the polymeric flow promoter is a styrene-acrylonitrile copolymer, poly(methyl (meth)acrylate), polystyrene, methyl (meth)acrylate-styrene-acrylonitrile, or a combination thereof.

18. The composition of claim 1 wherein the polymeric flow promoter is a styrene-acrylonitrile copolymer that is present in the polycarbonate composition in an amount of 1 to 30 weight percent, based on the total weight of polycarbonate, elastomer-modified graft copolymer, and styrene-acrylonitrile copolymer.

19. An article molded from the composition of claim 1.

20. The article of claim 19 wherein the article is an automotive part selected from the group consisting of spoilers, instrument panels, instrument panel retainers, interior trim, truck roof fairings, truck hoods, car hoods, bumpers, mirror housings, and electroplated wheel covers, hub caps, emblem logos, exterior trim, and door handles, car and truck grilles.

21. The composition of claim 1 wherein the acid is a mineral acid or an alkyl or tetrafluoroalkyl substituted mineral acid that ionizes in water.

\* \* \* \* \*